United States Patent Office 3,039,562
Patented June 19, 1962

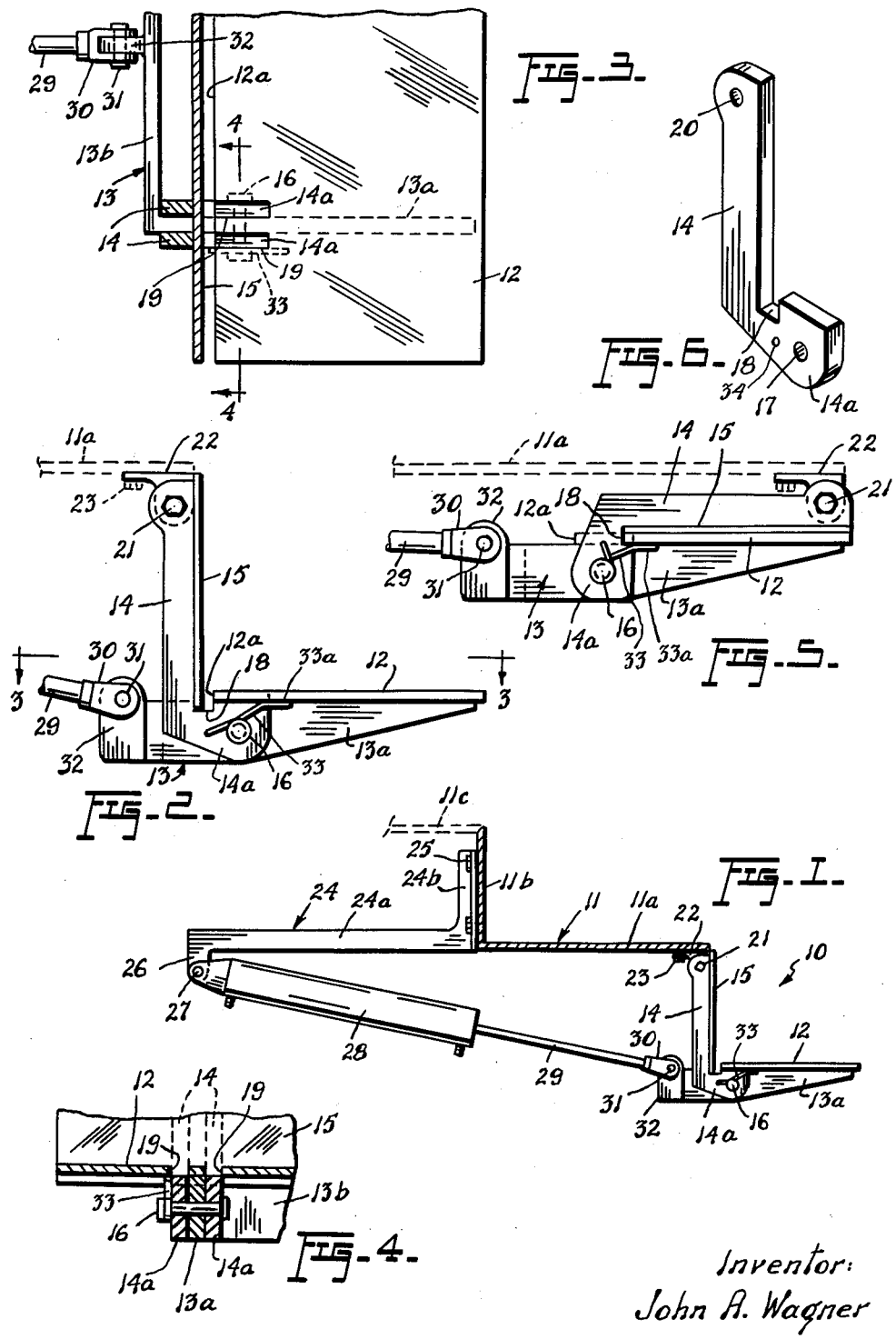

3,039,562
RETRACTABLE VEHICLE STEPS
John A. Wagner, Rte. 1, Weatherly, Pa.
Filed Nov. 6, 1959, Ser. No. 851,349
1 Claim. (Cl. 182—91)

This invention relates to new and useful improvements in retractable steps for vehicles such as buses, street cars, railroad cars, trucks and other similar conveyances, and the principal object of the invention is to facilitate safe and convenient embarkation and disembarkation of persons on and from such vehicles where the distance or height of the usual steps above the ground is too excessive to permit safe and convenient stepping.

An important feature of the present invention resides in a simple arrangement of parts and a positive and dependable operation, while another important feature resides in an improved arrangement of the retractable step assembly so that, as a unit, it may be quickly and easily installed on vehicles of various sizes and types.

With the foregoing more important objects and features in view and such other objects and features as may become apparent as this specification proceeds, the present invention will be understood from the following description taken in conjunction with the accompanying drawings, wherein like characters of reference are used to designate like parts, and wherein:

FIGURE 1 is a side elevational view of the retractable step unit in its projected or operative position and also showing in cross-section a portion of the usual, fixed steps of a vehicle;

FIGURE 2 is a fragmentary side elevational view of the retractable step unit on an enlarged scale, also showing the same in its projected or operative position;

FIGURE 3 is a fragmentary horizontal sectional view, taken substantially in the plane of the line 3—3 in FIGURE 2;

FIGURE 4 is a fragmentary sectional detail, taken substantially in the plane of the line 4—4 in FIGURE 3;

FIGURE 5 is a fragmentary view, similar to that shown in FIGURE 2 but illustrating the step in its retracted position; and FIGURE 6 is a perspective view of one of the riser members used in the invention.

Referring now to the accompanying drawings in detail, the retractable step assembly of the present invention is designated generally by the reference numeral 10 and is adapted for use in connection with the usual, fixed step 11 of a vehicle. The step 11 comprises a fixed tread 11a and a fixed riser 11b, the portion shown by the dotted lines 11c representing the vehicle floor if only one fixed step 11 exists, or representing the tread of the next higher step if a plurality of the fixed steps exist, it being understood, of course, that the assembly 10 is associated with the lowermost of the plurality of fixed steps in such instance.

The retractable step assembly 10 embodies in its construction a tread plate 12 which is secured in any suitable manner to the side portions of a horizontally disposed, U-shaped yoke 13, only one of these side portions being illustrated at 13a but it being understood that the tread plate 12 is elongated and that the two side portions 13a of the U-shaped yoke are spaced apart transversely of the plate. Each of the side portions 13a thus constitutes a tread member for supporting the tread plate, the rear or inner edge 12a of which is spaced forwardly or outwardly from the bight portion 13b of the yoke.

A pair of spaced parallel riser members 14 are disposed at the opposite sides of each tread member 13a adjacent the bight portion 13b of the yoke and have a riser plate 15 suitably secured thereto, the lower edge of the riser plate extending somewhat below the tread plate 12 when the device is in its operative position, as shown in FIGURES 1 and 2. The lower ends of the riser members 14 are provided with integral ears or extensions 14a having apertures 17 therein to receive bolts, pins or other similar elements 16 which also pass through registering apertures formed in the tread members 13a and serve to pivotally connect the tread and riser members together. The ears 14a have notches 18 provided therein to receive the lower edge portion of the riser plate 15, and the tread plate 12 is provided in its rear or inner edge portion with open slots 19 which are disposed immediately above the ears 14a when the device is in the projected position shown in FIGURE 2. However, when the device is retracted to the position shown in FIGURE 5, these solts receive therein portions of the ears 14a and thus facilitate folding of the step to a compact form wherein the plates 12, 15 are in full contact and the rear edge 12a of the plate 12 projects rearwardly or inwardly beyond the ears, as shown.

The upper end portions of the riser member 14 are provided with apertures 20 to receive bolts, pins or other suitable elements 21 which also pass through a bearing block 22 disposed between the upper end portions of the riser members in each pair, whereby the riser members are pivotally connected to the bearing blocks.

The blocks 22 are secured by suitable bolts 23 to the underside of the front or outer edge portion of the tread 11a of the fixed step 11, and the invention also includes a substantially L-shaped support bracket 24 having a relatively long, horizontal arm 24a and a relatively short, vertical arm 24b, the latter being secured by suitable bolts 25 to the rear or inner surface of the fixed step riser 11b, so that the arm 24a extends rearwardly or inwardly therefrom. The rear or inner end of the arm 24a is provided with a downwardly projecting, apertured lug 26 to which is pivotally connected by a suitable pin 27 one end of a double-acting air cylinder 28, the latter having a reciprocable piston rod 29 which is provided with a fork 30, pivotally connected by a bolt or pin 31 to an apertured lug 32 secured to the bight portion 13b of the aforementioned yoke 13.

It will be apparent from the foregoing that the relative arrangement and proportions of the various parts are such that when the piston rod 29 of the cylinder 28 is projected, the step assembly 10 will be in its projected, or operative position as shown in FIGURES 1 and 2, and conversely, when the piston rod is retracted into the cylinder, the step assembly will be retracted to the position shown in FIGURE 5. It is to be particularly noted that when the assembly is retracted, the tread and riser plates 12, 15 are in face to face contact and, together with the tread and riser members 13a, 14, fully concealed in a very compact form under the tread 11a of the fixed step 11.

Moreover, the arrangement of the entire assembly 10 is such that it may be installed, as a self-contained unit, being attached to the fixed step 11 only by the bolts 23 and 25 which constitute sole means for mounting the assembly in place.

It will be noted that when the step assembly is in its projected or operative position, the bight portion 13b of the yoke 13 is in abutment with the rear or inside surfaces of the riser members 14 disposed between the side portions 13a of the yoke, whereby to prevent the portions or members 13a from swinging downwardly when weight is applied to the tread plate 12.

Inasmuch as during the projecting and retracting movement of the step assembly there may be some tendency for a certain amount of flexing or buckling to take place between the pivot points 16, 31 and 27, such flexing or buckling would permit the tread plate 12 to slope downwardly from the pivot means 16, rather than to be horizontal while the step assembly is being projected or retracted. This is eliminated by the provision of resilient means for urging the tread plate to a horizontal position, such resilient means being located at any suitable point in the assembly, such as for example, a coil spring 33 positioned on each of the pivot pins 16 and having one end thereof anchored in a suitable aperture 34 formed in the adjacent extension 14a, and having its other end portion bearing against the underside of the tread plate 12, as indicated at 33a. The springs 33 are wound so as to urge the tread plate 12 upwardly at all times, so that downward sloping of the tread plate during projection and retraction is prevented.

Although the cylinder 28 has been described as an air cylinder, obviously a vacuum cylinder or a hydraulic cylinder may be used.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

A retractable vehicle step assembly, comprising in combination a horizontally disposed substantially U-shaped yoke including a pair of transversely spaced side portions and a bight portion connecting the same together, an elongated tread plate secured to and extending transversely between the side portions of said yoke, said tread plate having a rear edge spaced forwardly from the bight portion of the yoke, a pair of transversely spaced riser members disposed at the inside of the yoke side portions and pivoted at their upper ends to a vehicle structure for swinging in vertical planes, offset ears provided integrally at the lower ends of said riser members and pivotally connected to the respective yoke side portions at points below said tread plate, the rear edge portion of the tread plate being provided with open slots receiving said ears when the step assembly is retracted, the bight portion of said yoke abutting rear edges of said riser members when the step assembly is projected whereby to support weight on said tread plate, and means carried by the vehicle structure and operatively connected to the bight portion of said yoke for projecting and retracting the step assembly.

References Cited in the file of this patent
UNITED STATES PATENTS

| | | |
|---|---|---|
| 789,805 | Gunn | May 16, 1905 |
| 1,109,224 | Herrin | Sept. 1, 1914 |
| 1,122,063 | Blake | Dec. 22, 1914 |
| 2,153,946 | Linstead | Apr. 11, 1939 |
| 2,458,618 | McDonald | Jan. 11, 1949 |